US011725936B2

(12) United States Patent
Millane et al.

(10) Patent No.: US 11,725,936 B2
(45) Date of Patent: *Aug. 15, 2023

(54) TWO DATUM VIAL MOUNTING SYSTEM AND METHOD

(71) Applicant: Milwaukee Electric Tool Corporation, Brookfield, WI (US)

(72) Inventors: Christopher R. Millane, Menomonee Falls, WI (US); Jacob D. Hadfield, Brookfield, WI (US); Richard J. LaSota, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,847

(22) Filed: Nov. 17, 2021

(65) Prior Publication Data
US 2022/0074741 A1 Mar. 10, 2022

Related U.S. Application Data

(63) Continuation of application No. 16/752,424, filed on Jan. 24, 2020, now Pat. No. 11,193,764, which is a
(Continued)

(51) Int. Cl.
*G01C 9/28* (2006.01)
*G01C 9/34* (2006.01)

(52) U.S. Cl.
CPC .............. *G01C 9/28* (2013.01); *G01C 9/34* (2013.01)

(58) Field of Classification Search
CPC .................................. G01C 9/28; G01C 9/34
(Continued)

(56) References Cited

U.S. PATENT DOCUMENTS

| 1,085,342 A | 1/1914 | Kalsow |
| 1,154,873 A | 9/1915 | Manson |

(Continued)

FOREIGN PATENT DOCUMENTS

| AU | 198177748 A | 12/1982 |
| AU | 529587 B | 6/1983 |

(Continued)

OTHER PUBLICATIONS

International Search Report and Written Opinion for International Application No. PCT/US2020/013900, dated May 11, 2020, 14 pages.

*Primary Examiner* — George B Bennett
(74) *Attorney, Agent, or Firm* — Reinhart Boerner Van Deuren s.c.

(57) ABSTRACT

An automatic process and structural features for accurately producing levels is provided. The process enables more rapid production of levels, less operator work or error, and the ability to quantify errors and tolerances in the manufacture of the level. Coupling a level datum plane formed on the endcaps of a vial with a level datum plane of a frame ensures accurate construction of a level that can be automated and toleranced. Ensuring that the level datum plane created at the endcaps remains parallel (or at some other predesigned angle) to the measuring surfaces of the level reduces labor to manufacture the level and ensures measurement accuracy.

20 Claims, 7 Drawing Sheets

Related U.S. Application Data continuation of application No. PCT/US2020/013900, filed on Jan. 16, 2020.

(60) Provisional application No. 62/793,691, filed on Jan. 17, 2019.

(58) Field of Classification Search
USPC .................................................. 33/379, 381
See application file for complete search history.

(56) References Cited

U.S. PATENT DOCUMENTS

| | | |
|---|---|---|
| 1,172,971 A | 2/1916 | Frank |
| 1,211,882 A | 1/1917 | Schade |
| 1,229,916 A | 6/1917 | Duncan |
| 1,299,940 A | 4/1919 | Heusser |
| 1,498,158 A | 6/1924 | Eden |
| 1,542,512 A | 6/1925 | Lett |
| 1,596,329 A | 8/1926 | Axt |
| 1,599,048 A | 9/1926 | Hansen |
| 1,635,857 A | 7/1927 | Murray |
| 1,689,982 A | 10/1928 | Vogel |
| 1,702,689 A | 2/1929 | Duemler |
| 1,757,283 A | 5/1930 | Zieman |
| 2,014,420 A | 9/1935 | Zieman |
| 2,102,364 A | 12/1937 | Langsner |
| 2,206,817 A | 7/1940 | Mann |
| 2,301,769 A | 11/1942 | Babcock |
| 2,329,978 A | 9/1943 | Brunson |
| 2,502,235 A | 3/1950 | Schultes et al. |
| 2,536,788 A | 1/1951 | Vaida |
| 2,541,641 A | 2/1951 | Dodson |
| 2,592,941 A | 4/1952 | Moore |
| 2,607,994 A | 8/1952 | Keuffel |
| 2,639,514 A | 5/1953 | Garrison |
| 2,692,440 A | 10/1954 | Walters |
| 2,755,561 A | 7/1956 | Lafosse |
| 2,761,215 A | 9/1956 | Macklanburg |
| 2,789,363 A | 4/1957 | Miley |
| 2,792,638 A | 5/1957 | Pugel |
| 2,833,054 A | 5/1958 | Wheeler |
| 2,961,774 A | 11/1960 | Dreier |
| 2,970,381 A | 2/1961 | Pierce |
| 2,993,281 A | 7/1961 | Dock |
| 3,003,054 A | 10/1961 | Hubbard |
| 3,167,870 A | 2/1965 | Steeter |
| 3,172,212 A | 3/1965 | Pappas |
| 3,190,010 A | 6/1965 | Johnson |
| 3,192,641 A | 7/1965 | Jones |
| 3,311,990 A | 4/1967 | Wrights |
| 3,442,024 A | 5/1969 | Don |
| 3,456,354 A | 7/1969 | Wright |
| 3,491,454 A | 1/1970 | Wright |
| 3,513,558 A | 5/1970 | Kuchta et al. |
| 3,561,128 A | 2/1971 | Ostrager et al. |
| 3,593,428 A | 7/1971 | Jacoff |
| 3,618,222 A | 11/1971 | Ostrager |
| 3,724,087 A | 4/1973 | Ostrager |
| 3,824,700 A | 7/1974 | Rutty |
| 3,871,109 A | 3/1975 | Vaida |
| 3,871,110 A | 3/1975 | Gutowski et al. |
| 3,878,618 A | 4/1975 | Freeman |
| 3,909,952 A | 10/1975 | Lagasse |
| 3,921,306 A | 11/1975 | Provi |
| 4,073,062 A | 2/1978 | Wright |
| 4,112,584 A | 9/1978 | Kooi et al. |
| 4,124,940 A | 11/1978 | Vaida |
| 4,150,492 A | 4/1979 | Tracy |
| 4,179,125 A | 12/1979 | Cone et al. |
| 4,274,208 A | 6/1981 | Yakkel |
| 4,292,741 A | 10/1981 | Scandella |
| 4,407,075 A | 10/1983 | MacDermott et al. |
| 4,419,833 A | 12/1983 | Wright |
| 4,492,038 A | 1/1985 | Mayes |
| 4,525,192 A | 6/1985 | Booms |
| 4,531,301 A | 7/1985 | Tau |
| 4,571,845 A | 2/1986 | Wright et al. |
| 4,586,263 A | 5/1986 | Brattain |
| 4,593,475 A | 6/1986 | Mayes |
| 4,622,837 A | 11/1986 | Bergman |
| 4,628,612 A | 12/1986 | Hori et al. |
| 4,685,219 A | 8/1987 | Haefner et al. |
| 4,757,615 A | 7/1988 | Cecil |
| 4,862,595 A | 9/1989 | Drumright |
| 4,894,925 A | 1/1990 | Langmaid |
| 4,912,854 A | 4/1990 | Weadon |
| 4,947,556 A | 8/1990 | Peil |
| 4,970,796 A | 11/1990 | Masters et al. |
| 4,991,303 A | 2/1991 | Marth et al. |
| 4,996,777 A | 3/1991 | Grosz |
| 5,003,699 A * | 4/1991 | Wright ..................... G01C 9/34 33/379 |
| 5,020,232 A | 6/1991 | Whiteford |
| 5,105,549 A | 4/1992 | Johnson |
| 5,127,167 A | 7/1992 | Kennedy |
| 5,167,075 A | 12/1992 | Weldy et al. |
| 5,177,873 A | 1/1993 | Tate |
| 5,199,177 A | 4/1993 | Hutchins et al. |
| 5,207,004 A | 5/1993 | Gruetzmacher |
| 5,255,443 A | 10/1993 | Schmidt |
| 5,279,041 A | 1/1994 | Wright |
| 5,337,222 A | 8/1994 | Shirai et al. |
| 5,339,530 A | 8/1994 | Wright |
| 5,406,714 A | 4/1995 | Baker et al. |
| 5,414,937 A | 5/1995 | Denley |
| 5,509,210 A | 4/1996 | Murphy |
| 5,561,911 A | 10/1996 | Martin |
| 5,697,161 A | 12/1997 | Denley |
| 5,709,034 A | 1/1998 | Kohner |
| 5,749,152 A | 5/1998 | Goss et al. |
| 5,926,965 A | 7/1999 | Shijo et al. |
| 6,026,581 A | 2/2000 | Gruetzmacher |
| 6,148,530 A | 11/2000 | Jacoff et al. |
| 6,173,502 B1 | 1/2001 | Scarborough |
| 6,243,957 B1 | 6/2001 | Gruetzmacher et al. |
| 6,360,446 B1 | 3/2002 | Bijawat et al. |
| 6,434,842 B1 | 8/2002 | Cruz |
| 6,481,111 B1 | 11/2002 | Myrick |
| 6,560,885 B1 | 5/2003 | Cosentino |
| 6,568,095 B2 | 5/2003 | Snyder |
| 6,572,073 B2 | 6/2003 | Jacoff |
| 6,674,276 B2 | 1/2004 | Morgan et al. |
| 6,760,975 B1 | 7/2004 | Schmidt |
| 6,782,628 B2 | 8/2004 | Liao |
| 6,792,686 B2 | 9/2004 | Krehel et al. |
| 6,851,200 B2 | 2/2005 | Tan et al. |
| 6,918,187 B2 | 7/2005 | Schaefer |
| 7,024,781 B1 | 4/2006 | Cowie |
| 7,047,654 B2 | 5/2006 | Szumer |
| 7,059,059 B1 | 6/2006 | Ames |
| 7,089,676 B2 | 8/2006 | Godinez |
| 7,137,209 B2 | 11/2006 | Northern et al. |
| 7,243,435 B2 | 7/2007 | Morrissey et al. |
| 7,263,778 B2 | 9/2007 | Lang et al. |
| 7,266,898 B2 | 9/2007 | El-Katcha et al. |
| 7,316,074 B2 | 1/2008 | Tran et al. |
| 7,328,516 B2 | 2/2008 | Nash et al. |
| 7,360,316 B2 | 4/2008 | Hoover et al. |
| 7,360,317 B1 | 4/2008 | Lavalle |
| 7,367,129 B2 | 5/2008 | Lu |
| 7,464,479 B2 | 12/2008 | Tran |
| 7,472,486 B2 | 1/2009 | Tran et al. |
| 7,472,487 B2 | 1/2009 | Tran et al. |
| 7,536,798 B2 | 5/2009 | Silberberg |
| 7,669,342 B1 | 3/2010 | Crain et al. |
| 7,707,733 B1 | 5/2010 | Crain et al. |
| 7,765,706 B2 | 8/2010 | Scheyer |
| 7,779,545 B2 * | 8/2010 | Kallabis .................. G01C 9/32 33/379 |
| 7,832,113 B1 | 11/2010 | Richins |
| 7,946,045 B2 | 5/2011 | Allemand |
| 8,061,051 B2 | 11/2011 | Allemand |
| 8,336,221 B2 | 12/2012 | Steele et al. |
| 8,375,591 B2 | 2/2013 | Christianson et al. |

(56) References Cited

U.S. PATENT DOCUMENTS

| | | |
|---|---|---|
| 8,615,892 B1 | 12/2013 | Morrissey |
| 8,631,584 B2 | 1/2014 | Steele et al. |
| 8,646,186 B2 | 2/2014 | Lettkeman |
| 8,745,885 B2 | 6/2014 | Christianson et al. |
| 8,850,710 B1 | 10/2014 | Rodrigue et al. |
| 8,910,390 B2 | 12/2014 | Steele et al. |
| 8,925,212 B2 | 1/2015 | Allemand |
| 9,015,982 B1 | 4/2015 | Powers |
| 9,021,710 B2 | 5/2015 | Silberberg |
| 10,077,981 B2 * | 9/2018 | Sanchez ............... G01C 9/34 |
| 10,823,561 B2 | 11/2020 | Neitzell et al. |
| 10,928,197 B2 | 2/2021 | Wojciechowski et al. |
| D936,502 S * | 11/2021 | Wojciechowski ....... G01C 9/34 |
| | | D10/69 |
| 11,193,764 B2 * | 12/2021 | Millane ................. G01C 9/28 |
| 11,333,494 B1 * | 5/2022 | McGinity ............... H02G 3/10 |
| 2002/0066199 A1 | 6/2002 | Hanson |
| 2003/0079357 A1 | 5/2003 | Liao |
| 2003/0093909 A1 | 5/2003 | Liao |
| 2004/0025360 A1 | 2/2004 | Obergoenner |
| 2005/0066533 A1 | 3/2005 | Wheeler et al. |
| 2009/0151179 A1 | 6/2009 | Scheyer |
| 2010/0000105 A1 | 1/2010 | Zhang et al. |
| 2010/0218391 A1 * | 9/2010 | Christianson ........... G01C 9/28 |
| | | 33/379 |
| 2011/0113638 A1 | 5/2011 | Scheyer et al. |
| 2011/0265338 A1 | 11/2011 | Christianson et al. |
| 2013/0283625 A1 | 10/2013 | Sullivan |
| 2013/0305549 A1 | 11/2013 | Lueck et al. |
| 2014/0101950 A1 | 4/2014 | Zhuang |
| 2015/0113819 A1 | 4/2015 | Silberberg |
| 2015/0160008 A1 | 6/2015 | Silberberg |

FOREIGN PATENT DOCUMENTS

| | | |
|---|---|---|
| AU | 1998089400 A1 | 5/1999 |
| AU | 1999032177 | 1/2002 |
| AU | 2007202106 A1 | 11/2008 |
| AU | 2009325858 B2 | 7/2014 |
| AU | 2012223329 B2 | 4/2015 |
| AU | 2013206805 B2 | 4/2015 |
| AU | 2010318688 B2 | 8/2015 |
| AU | 2015261616 | 12/2015 |
| CA | 1067689 A | 12/1979 |
| CA | 1129191 A | 8/1982 |
| CA | 1227030 A | 9/1987 |
| CA | 1273912 | 9/1990 |
| CA | 2027228 A1 | 4/1991 |
| CA | 1307394 C | 9/1992 |
| CA | 2211475 A1 | 1/1999 |
| CA | 2181105 C | 1/2002 |
| CA | 2562616 A1 | 5/2007 |
| CA | 2685604 A1 | 11/2008 |
| CA | 2639879 A1 | 5/2009 |
| CA | 2655449 A1 | 9/2009 |
| CN | 202393385 | 8/2012 |
| EP | 1322910 A1 | 2/2003 |
| GB | 1213675 A | 11/1970 |
| GB | 1307651 A | 8/1973 |
| GB | 1363983 A | 8/1974 |
| GB | 2266769 A | 11/1993 |
| JP | 04-053533 | 12/1992 |
| JP | 05-087519 | 11/1993 |
| JP | 07-234125 | 9/1995 |
| JP | 11-173843 | 7/1999 |
| WO | WO1987002314 A1 | 4/1987 |
| WO | WO2001013065 A1 | 2/2001 |
| WO | WO2013024275 A1 | 2/2013 |

* cited by examiner

TWO DATUM VIAL MOUNTING SYSTEM AND METHOD

CROSS-REFERENCE TO RELATED PATENT APPLICATIONS

The present application is a continuation of U.S. application Ser. No. 16/752,424, filed Jan. 24, 2020, which is a continuation of International Application No. PCT/US2020/013900, filed Jan. 16, 2020, which claims the benefit of and priority to U.S. Provisional Patent Application 62/793,691 filed on Jan. 17, 2019, which are incorporated herein by reference in their entireties.

BACKGROUND OF THE INVENTION

The present invention relates generally to the field of levels. The present invention relates specifically to the manufacture and calibration of levels.

Levels are used for a variety of applications, particularly in the building and construction trades. Traditionally to measure orientation, a level uses one or more vials that contain a liquid (e.g., ethanol) and a small bubble of gas (e.g., air). The walls of the vial are arcuate-shaped such that when the level is placed on a sufficiently horizontal or vertical surface, the bubble of air is aligned at or near the center of at least one of the vials.

SUMMARY OF THE INVENTION

One embodiment of the invention relates to a level. The level includes a vial with two endcaps and a frame with a level surface. The vial is formed from a manufacturing process (e.g., injection molding process) to include level surfaces. In some embodiments, the vial is molded without internal geometry and used on highly accurate fixturing to mill the internal barrel shape. The level surfaces define the fixturing and milling process to form a vial with a level plane. The vial may be filled with a liquid that contains a gas bubble within the liquid. The vial may be capped using ultrasonic welding or other methods to seal the one or more endcaps. The endcaps are rotated until the bubble is centered in the vial, within a specified tolerance. The frame is similarly formed or milled with coplanar mounting surfaces parallel to a level plane within a specified tolerance. The coplanar mounting surfaces of the frame are coupled to the coplanar level surfaces of the endcaps to form a calibrated vial, parallel with the frame measuring surfaces and within a specified tolerance.

Another embodiment of the invention relates to a torpedo level. The torpedo level includes a vial with two endcaps and an aluminum frame with a level surface. The vial contains a liquid and a gas bubble within the liquid. The vial is sealed with endcaps that define a level plane. The endcaps are rotated until the bubble is centered in the vial, within a specified tolerance. The aluminum frame is a cast aluminum part with coplanar mounting surfaces formed from casting tooling. The mounting surfaces are cast to be parallel with a measuring surface of the frame. The mounting surfaces of the frame are coupled to the level surfaces of the endcaps to form a calibrated vial within the frame.

Another embodiment of the invention relates to an automated method of installing a calibrated vial within a level. The method involves forming the vial with one or more endcaps on a level plane (e.g., injection molding). A liquid is sealed within the vial that includes a gas bubble. The sealed vial is coupled to level endcaps defining a level plane and placed in a calibration machine that uses a vision system to determine the location of the bubble within the vial. The calibration machine adjusts one or more ends of the vial up or down until the bubble is centered within a tolerance of the vial. Once the vial is centered within tolerance, the machine forms, cuts, and/or mills the vial to create level surfaces along the bottom of the vial. The level surfaces of the vial are coupled with mounting surfaces on the frame that create a plane parallel to the measuring surfaces of the frame.

Another embodiment of the invention relates to a level with a vial and a frame. The vial has first and second endcaps sealed on opposite ends of the vial. Each endcap has a level surface, such that the level surfaces of the first and second endcaps are coplanar and define a first plane. A fluid is captured within an internal volume formed by the vial and the endcaps, and a bubble is formed within the fluid. The frame has two mounting surfaces that are coplanar and define a second plane. The mounting surfaces receive the first and second endcaps of the vial. The frame also includes a level measuring surface. When the vial is mounted to the frame, the first and second planes are coplanar and/or parallel, such that the vial is parallel to the level measuring surface within a tolerance.

Another embodiment of the invention relates to a level with a vial and a frame. The vial has a first endcap sealed to a first end of the vial, and a second endcap sealed to a second end of the vial opposite the first end. Each endcap has a level surface and the level surface of the first endcap and the level surface of the second endcap are coplanar and define a first plane. A liquid is captured within an internal volume formed by the vial and the endcaps and a gas bubble is formed within the liquid. The level also includes a cast aluminum frame with two coplanar mounting surfaces that define a second plane. The mounting surfaces receive the first and second endcaps of the vial. Level measuring surfaces of the frame extend parallel to the second plane.

Another embodiment of the invention relates to a method of installing a calibrated vial within a level. The method includes forming the vial with endcaps on opposite sides of the vial, the vial comprising a level indicator located within the vial. The endcaps are coupled to flat vial mounting surfaces to provide a level frame having a planar measuring surface and flat vial mounting surfaces. The endcaps are coupled to the flat vial mounting surfaces of the frame. A location of the level indicator is determined within the vial when the measuring surfaces of the frame are oriented in a level configuration and the vial is oriented at the endcaps in a level position until the gas bubble is centered within the vial within a tolerance. The endcaps of the oriented vial are cut to form level surfaces on each endcap that define a level plane when the vial is oriented in a level position. When the level plane is formed by the cut endcaps and coupled to the flat surfaces on the frame, the vial is centered within the tolerance.

Alternative exemplary embodiments relate to other features and combinations of features as may be generally recited.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a vial mounted level are shown. Levels are used to measure whether a surface is parallel, perpendicular, or at a specific angle (e.g., 45°) to a level plane. Levels are a common instrument of the construction and manufacturing industries. Using conventional assembly techniques to make a level, a frame is formed, and measuring surfaces are machined or milled flat along a planar measurement surface. To attach a level vial to the frame, an operator inserts a liquid vial within an opening of the frame and applies glue between the vial and the frame. The operator then places the frame on a known level surface and adjusts the vial within the frame until the bubble in the vial is centered. The manual adjustment of the operator positions the vial relative to the frame. The operator manipulates the vial until the bubble is centered and the level shows a level indication on the known level surface. When the glue hardens, the vial is set within the level and the accuracy of the level depends on the accuracy of the operator's adjustments setting the vial within the frame of the level.

The conventional process for installing vials within a frame is labor-intensive and requires consistent and skilled operators. Calibration tolerances of the levels are imprecise because the accuracy and precision of the manufactured levels are operator dependent. Thus, each level may indicate different ranges of parallel planes when compared to the true level plane. Applicant has found that forming and/or machining level surfaces onto a vial that are coupled with mounting surfaces of the frame, the assembly process can be automated and the manufactured level maintains accuracy and precision within a predetermined and verifiable tolerance.

In addition, the labor required to produce a level is reduced, enabling the operator to produce more levels. In an automated process, the operator does not validate each manufactured level and can instead "spot-check" the accuracy of selected levels to validate the production process with standard production quality engineering protocols (e.g., 5S). In addition, the operator can work without special training to ensure that the assembled levels are accurate. As such, the operator's duties are more operational using statistical quality production processes and not as time intensive. The process manufactures more levels with enhanced accuracy and precision. Applicant has found that a level vial that includes level surfaces coupled to the mounting surfaces of the frame creates a plane that can be measured and within a predetermined tolerance or threshold of a plane created at the measuring surfaces of the level. Thus, a level that includes level surfaces on the vial and mounting surfaces on the frame is believed to provide several manufacturing and assembly advantages over conventional level designs and assembly methods.

Figure 1:
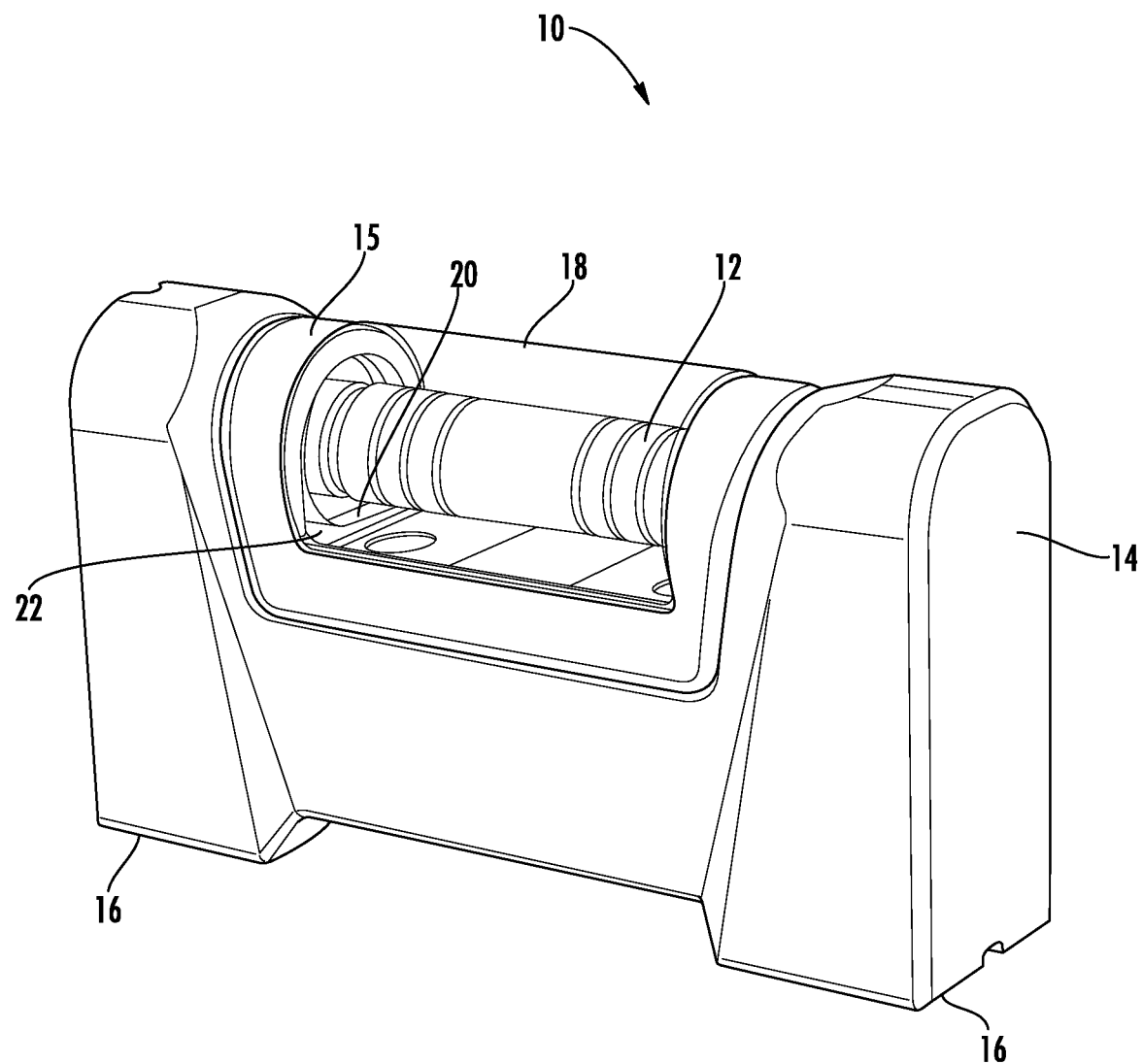
FIG. 1 is a perspective view of a level from above, such as a torpedo level, illustrating the frame, liquid vial, and optional lens, according to an exemplary embodiment.

Referring to FIG. 1, a level 10 is illustrated with one or more vials 12, a frame 14, and measuring surfaces 16. As illustrated in FIG. 1, level 10 may optionally include a protective shroud 15 and/or a protective lens 18. Illustrated in FIG. 1, but best seen in FIGS. 7 and 8, vial 12 includes endcaps 30, each with a level surface 20. Specifically, vial 12 has a first endcap 30 sealed to a first end and a second endcap 30 sealed to a second end of vial 12 opposite the first end. The level surfaces 20 of the first and second endcaps 30 are coplanar and define a first datum plane A 32. Vial 12 and endcaps 30 form an internal volume that captures a liquid and a bubble or level indicator 36 formed in the liquid. Level indicator 36 includes a bubble formed from gas or second liquid in vial 12. The walls of vial 12 are arcuate-shaped such that when level 10 is placed on a sufficiently horizontal or vertical surface, level indicator 36 of immiscible fluid, gas, or air (FIG. 5) is aligned at or near the center of vial 12.

Figure 4:
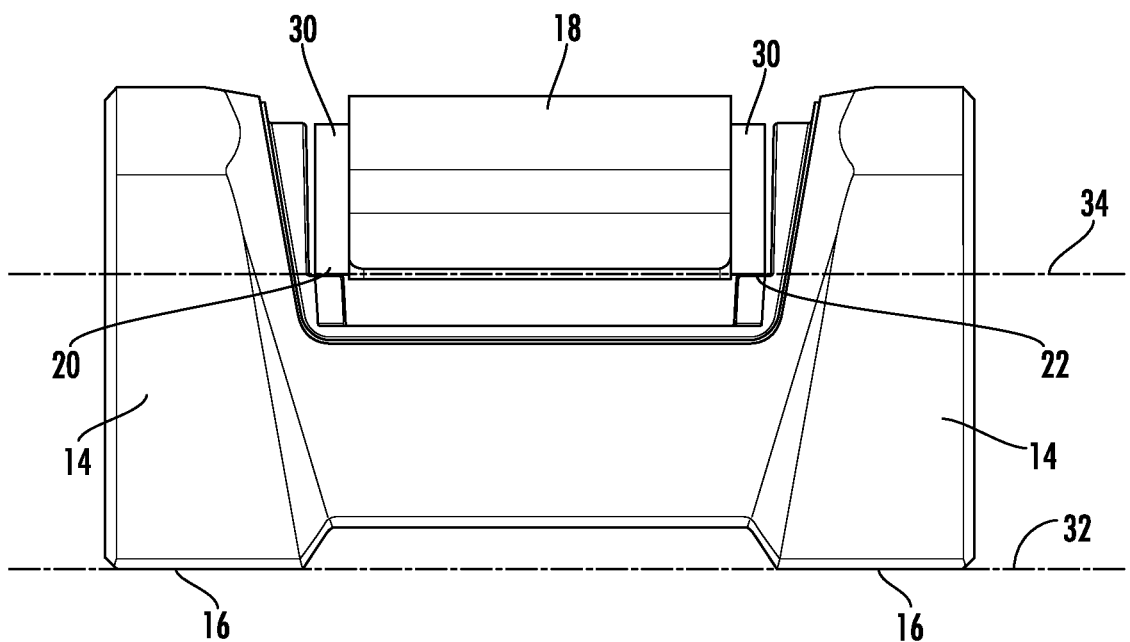
FIG. 4 is a front view of a level, illustrating the level surfaces of the endcaps coupled to the mounting surfaces of the frame, the level surfaces, and mounting surfaces being coplanar to each other and parallel to the measuring surfaces, according to an exemplary embodiment.

Frame 14 includes a flat mounting surface 22 that couples with the level surface 20 of vial 12. For example, frame 14 includes two coplanar or flat mounting surfaces 22 that define a second datum plane B 34 that couples with the first datum plane A 32 formed on level surfaces 20 of endcaps 30. In various embodiments, measuring surfaces 16 are parallel, perpendicular, or at another angle (e.g., 30°, 45°, 60°) relative to the first datum plane A 32 and/or second datum plane B 34. For example, endcaps 30 are oriented within frame 14 at a non-zero angle relative to datum planes 32 and/or 34. When coupled, level surfaces 20 of vial 12, and mounting surfaces 22 of frame 14 are coplanar and parallel to the measuring surfaces 16. As illustrated in FIG. 4, the datum plane A 32 formed by coplanar measuring surfaces 16 of frame 14 is parallel to the datum plane B 34 formed by coupling the coplanar level surfaces 20 and mounting surfaces 22. In some embodiments, datum plane 34 is perpendicular to measuring surfaces 16, or otherwise oriented at a predetermined angle to measuring surfaces 16 (e.g., 30°, 45°, or 60°). In each case, level indicator 36 in vial 12 indicates when measuring surfaces 16 are oriented at a specified angle to the level plane (e.g., 0°, 30°, 45°, 60°, 90°, or some other specified angle). In some embodiments, a second or third vial 12 is located within frame 14, e.g., oriented at a different angle to the level plane.

Figure 2:
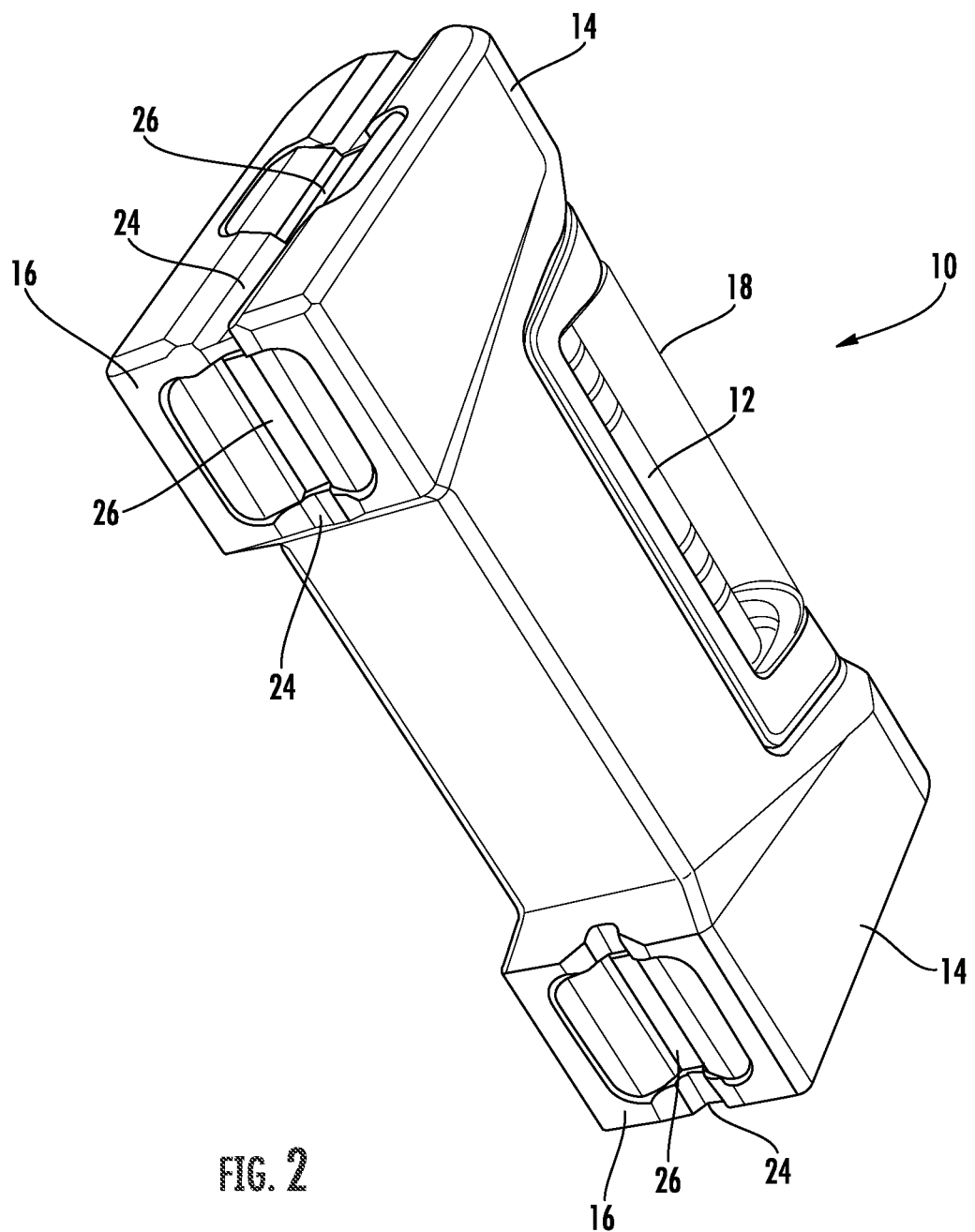
FIG. 2 is a bottom perspective view of the level of FIG. 1, showing the measuring surfaces, according to an exemplary embodiment.

Referring to FIG. 2, measuring surfaces 16 are shown along the bottom of level 10. The measuring surfaces 16 may include a detent 24 which includes one or more magnets 26. Detent 24 may enable measuring uneven surfaces, e.g., surfaces with a lip or protrusion. Detent 24 may also enable measuring the levelness of a stretched cord or line. Magnets 26 shown along the bottom and/or sides of frame 14 temporarily couple or join level 10 to a metallic surface, cord, line, or other ferromagnetic structure. FIG. 2 illustrates a machined side measuring surface 28 or side surface 28, perpendicular to measuring surfaces 16 on the bottom of frame 14. Machined side surface 28 enables measurements of perpendicularity, allows for storage (e.g., using magnet 26 along the side of level 10). Machined side surface 28 may also include a detent 24, as illustrated.

In some embodiments, one or more magnets 26 are located in the level measuring surface 16 that extends along a longitudinal axis or datum plane 32 of frame 14. Similarly, one or more magnets 26 are located along a side surface 28 that extends along an axis that is transverse to the longitudinal axis of frame 14. Detent 24 may be formed or located in level measuring surfaces 16 and/or side surfaces 28 of frame 14.

Figure 3:
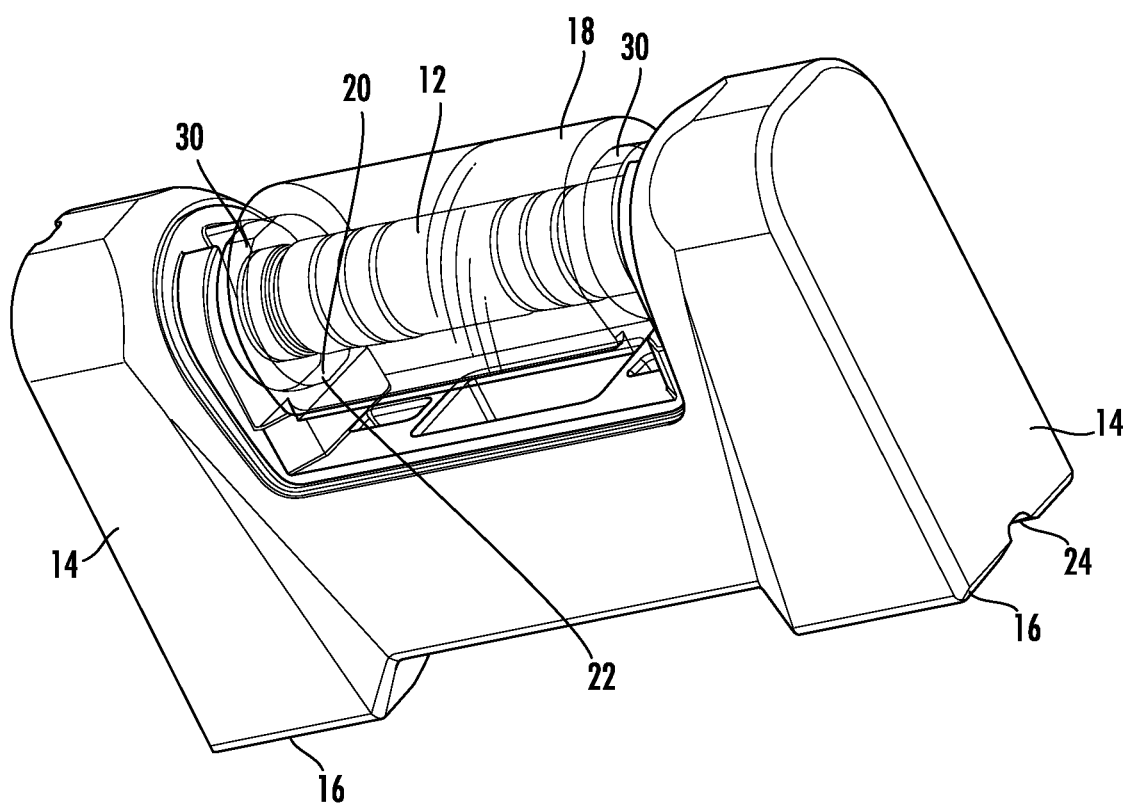
FIG. 3 is a top perspective view of a level, showing an assembled flat mating surface of the endcaps of the vial coupled to the mounting surfaces of the frame, according to an exemplary embodiment.

FIG. 3 illustrates a top perspective view of level 10 with shroud 15 removed to show level surfaces 20 of endcaps 30 coupled to mounting surfaces 22 of frame 14. Two coplanar mounting surfaces 22 are formed in frame 14, e.g., by an aluminum or steel casting process. In the illustrated embodiment, level surfaces 20 are between lens 18 and vial 12. As such, level surfaces 20 surround vial 12 and extend axially from vial 12 to create a plane that couples with mounting surfaces 22 of frame 14. Vial 12, lens 18, and/or endcaps 30 may be a single integral piece or vial 12 may couple to lens 18 and/or endcaps 30 (e.g., at the base of vial 12).

For example, vial 12 is formed from an injection molding process that forms level surfaces 20. The internal geometry of vial 12 may be milled or machined in a calibrated fashion to align with the coplanar level surfaces 20. Highly accurate fixturing ensures that level surfaces 20 define a level plane after milling. After filling vial 12 with liquid and a gas level indicator 36, the endcap 30 is sealed (e.g., with an ultrasonic welding process). In this way, vial 12 includes a sealed level indicator 36 defining a level orientation and two coplanar endcaps 30 with level surfaces 20. In some embodiments, endcaps 30 may be further machined or milled after manufacture to create or calibrate level surfaces 20.

Mounting surfaces 22 of frame 14 are constructed parallel to measuring surfaces 16 of frame 14. Level surfaces 20 of vial 12 are formed, injection-molded, milled or otherwise constructed such that when level surfaces 20 are flush with mounting surfaces 22 of frame 14, vial 12 is calibrated to measure angularity (e.g., levelness) with respect to measuring surfaces 16 of frame 14.

FIG. 4 illustrates the two datum vial mounting level 10 with shroud 15 removed. Datum plane A 32 (illustrated as a line in FIG. 4 because the plane 32 extends into and out of the page) connects two or more coplanar surfaces along measuring surfaces 16 along a coplanar plane between the two or more surfaces. Datum plane A 32 is offset from and parallel to datum plane B 34. Datum plane B 34 connects two or more flat measuring surfaces 20 machined into endcaps 30 of vial 12 and two or more adjacent mounting surfaces 22 of frame 14. Level surfaces 20 and mounting surfaces 22 are the only rigid point of contact between the frame 14 and vial 12. Glue or other adhesives can be used to join vial 12 to frame 14. Other manufacturing joining processes may also be used such as spot welding, fusing, or soldering. For example, adhesive can be inserted into gaps 38 in between endcaps 30 and frame 14 to secure vial 12 to frame 14. In this way, level surfaces 20 of vial 12 may couple to mounting surfaces 22 of frame 14 without interference at the coplanar junction. The adhesive does not force vial 12 in any direction relative to frame 14 but, when hardened, the adhesive ensures that level surfaces 20 and mounting surfaces 22 are kept in level alignment (e.g., when operating level 10). In some embodiments, endcaps 30 of vial 12 are spot welded to mounting surfaces 22 of frame 14.

Figure 5:
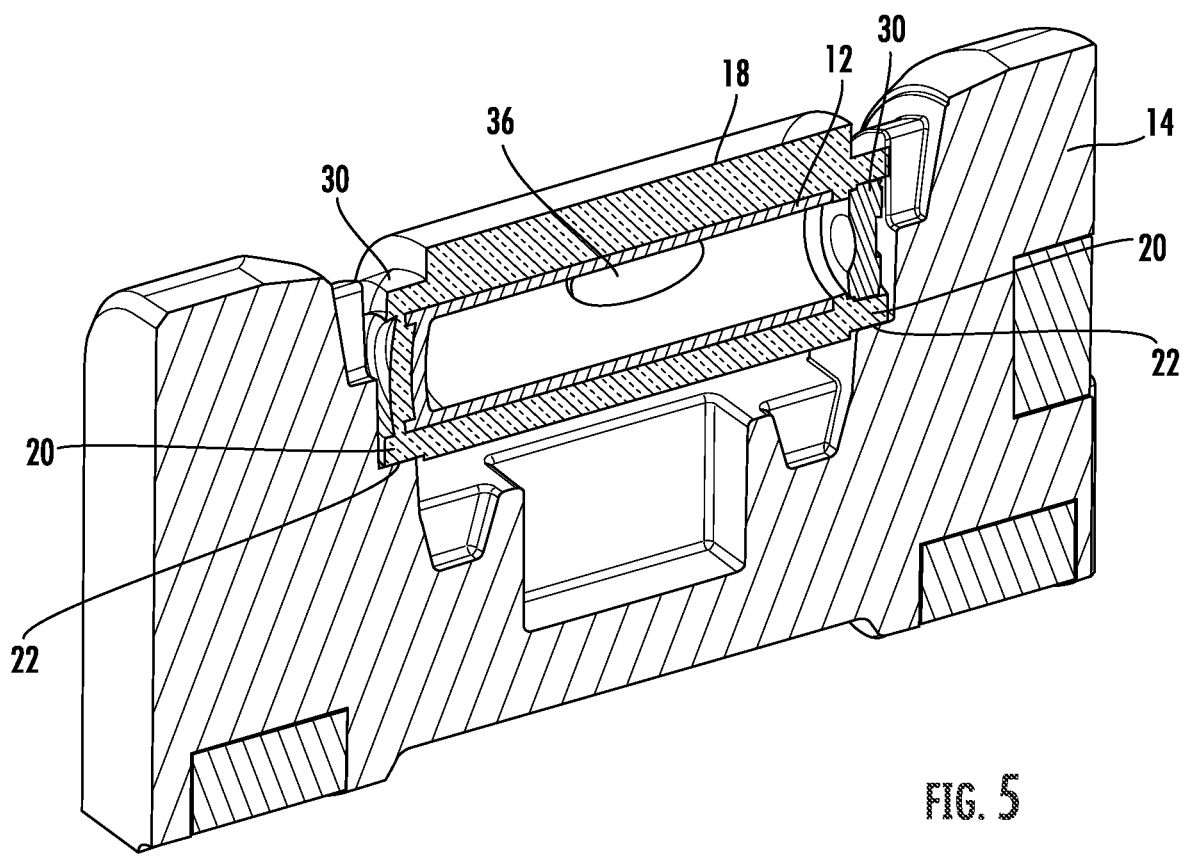
FIG. 5 is a cross-sectional view of a level illustrating the level surfaces of the vial coupled to the mounting surfaces of the frame, according to an exemplary embodiment.

FIG. 5 is a cross-sectional view of level 10 with the shroud 15 removed to illustrate the joint created between level surfaces 20 of vial 12 and mounting surfaces 22 of frame 14. After vial 12 is formed, filled with a liquid (e.g., ethanol), and sealed with a small level indicator 36 of gas (e.g., air), vial 12 can be placed in an injection and/or milling machine that calibrates vial 12. Endcaps 30 of vial 12 are calibrated through a machine automated process in which vial 12 is inserted and rotated until level indicator 36 is centered within vial 12. A machine automated process rotates vial 12 by one or more endcaps 30 to calibrate vial 12 within frame 14. Using a visual detection system, the machine automated process can detect when level indicator 36 is centered within vial 12. The machine automated process can determine within a specified tolerance when the endcaps 30 of vial 12 are level. Once level indicator 36 is within the center of vial 12 and within the tolerance specified, the endcaps 30 of vial 12 are formed (injection molded) and/or machined (e.g., milled) to form flat-level surfaces 20. Endcaps 30 of vial 12 are formed and/or machined to a specified tolerance to define datum plane B 34 (FIG. 4). Endcaps 30 may be metallic and used to couple to the ends of vial 12. Endcaps 30 may be integral and formed in the same process as vial 12. In some embodiments, endcaps 30 are the same material as vial 12. In some embodiments, endcaps 30 are a polymer or plastic material.

Similarly, frame 14 is manufactured to have measuring surfaces 16 defining datum plane A 32 and mounting surfaces 22 coupled to level surfaces 20 defining datum plane B 34 (FIG. 4). In some embodiments, frame 14 is formed in a manufacturing process with measuring surfaces 16 and mounting surfaces 22. Frame 14 may be an injection-molded plastic or polymer. In some embodiments, frame 14 is a metallic cast (e.g., an aluminum or steel cast) to have measuring surfaces 16 parallel to mounting surfaces 22, and no additional work is needed following the casting process to level mounting surfaces 22. Frame 14 may be forged or die forged with measuring surfaces 16 and mounting surfaces 22. In other embodiments, the measuring surfaces 16 and/or mounting surfaces 22 are milled, cut, or machined after fabrication. Other manufacturing techniques may be used to form frame 14, such as but not limited to forging, die forging, die-cast forging, extrusion, and/or a combination of manufacturing methods. The manufacturing processes can subject datum plane A 32 and datum plane B 34 to traditional manufacturing tolerances, controlling the accurate measurement of level 10 once manufactured.

Figure 6:
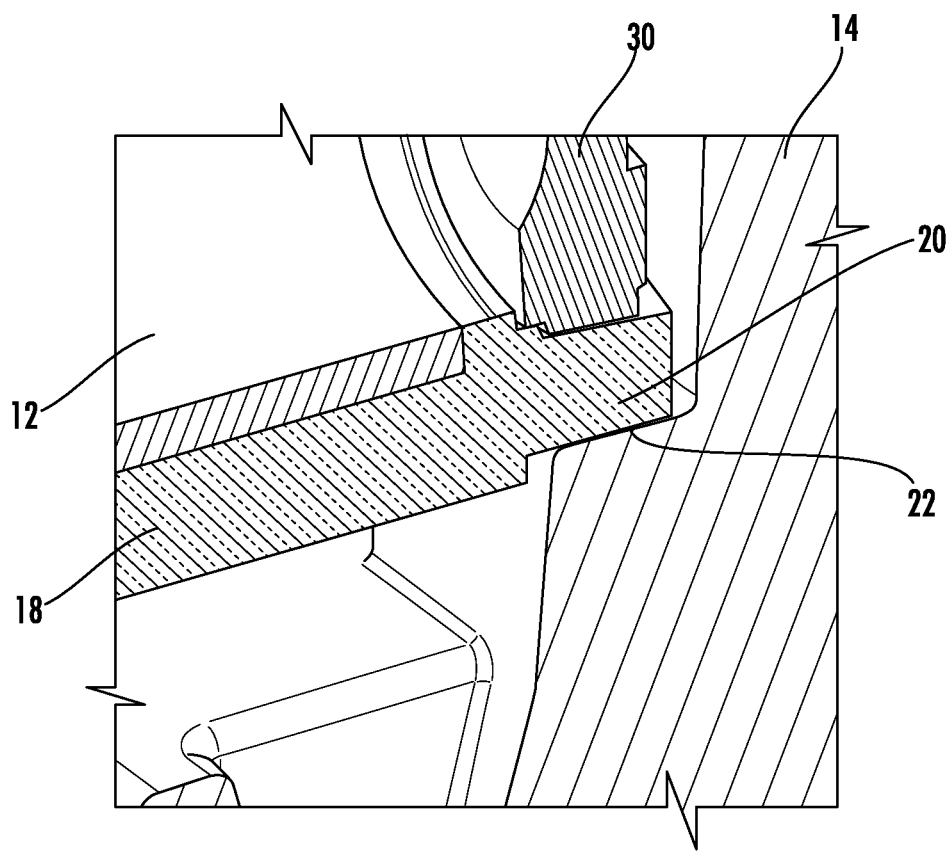
FIG. 6 is a detailed view of the level surface of the vial coupled to the flat mounting surface of the frame, according to an exemplary embodiment.

FIG. 6 is a detailed view of the joint created by mounting surfaces 22 and the level surface 20. The formed and/or milled endcaps 30 are illustrated with a level surface 20 coupled to flat mounting surface 22 of the frame 14. As illustrated, gap 38 provides an area to insert glue or other adhesive and join the endcap 30 to the frame 14. Shroud 15 may also be joined by the adhesive in gap 38 to surround lens 18 and protect vial 12.

Figure 7:
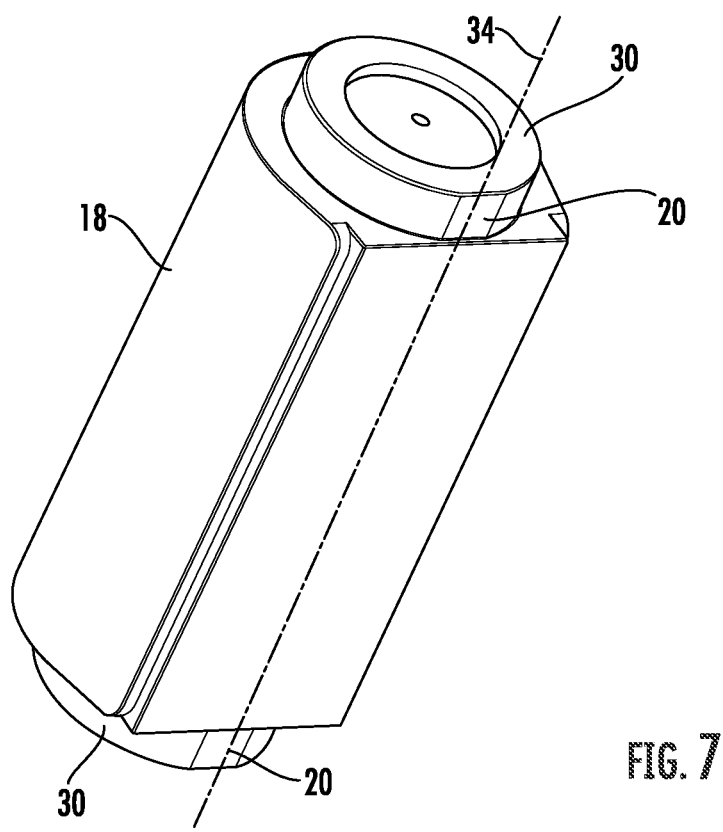
FIG. 7 is a detailed view of the level vial with endcaps of FIG. 4, illustrating the level surfaces machined into the endcaps, according to an exemplary embodiment.

FIG. 7 is an isolated perspective view of vial 12 with endcaps 30 and a lens 18 surrounding vial 12. The machine uses visual analysis to rotate endcaps 30 until level indicator 36 is centered to calibrate vial 12. The endcaps 30 are milled to define datum plane B 34. As illustrated, endcaps 30 have been milled to form level surfaces 20 along datum plane 34 which support vial 12 in a level position at mounting surfaces 22 of frame 14. An optional transparent lens 18 is shown surrounding vial 12. When vial 12 is mounted or coupled to frame 14, the plane 34 formed by level surfaces 20 is coplanar with the plane 34 formed by mounting surfaces 22, such that vial 12 is parallel to level measuring surfaces 16 within a specified tolerance or threshold value.

Figure 8:
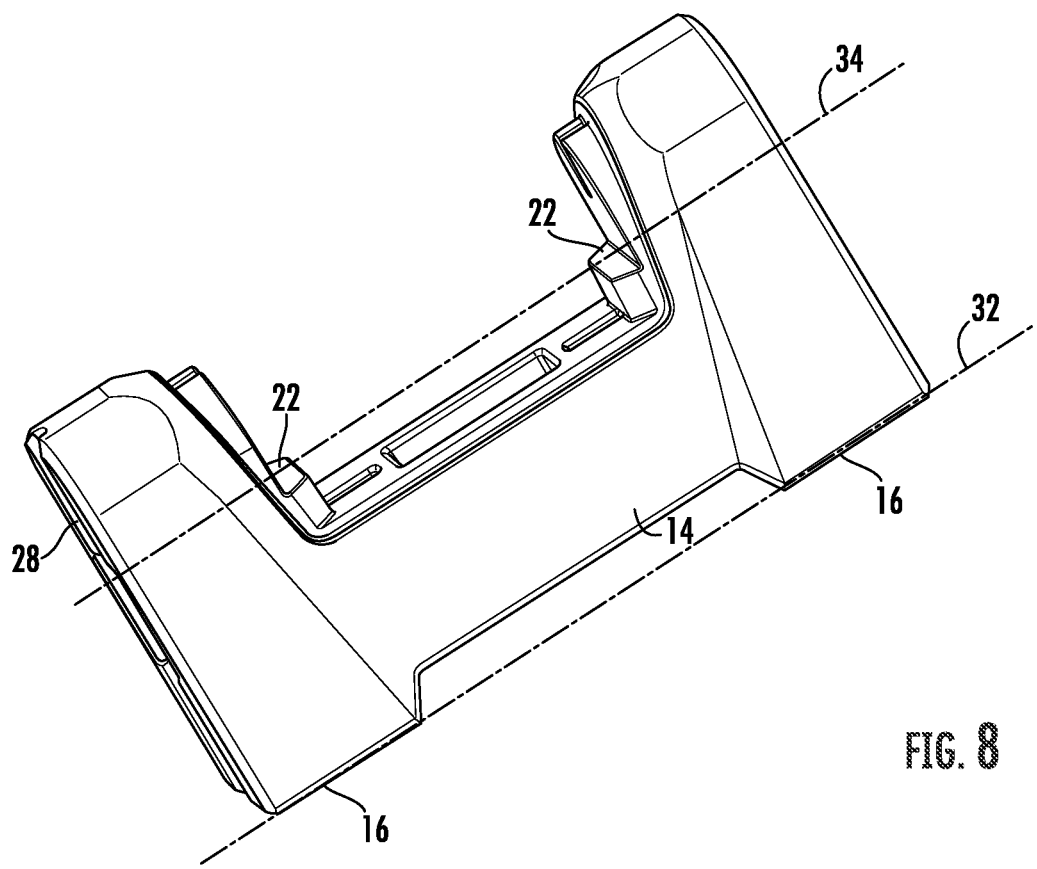
FIG. 8 is a detailed view of the level frame of FIG. 4, illustrating the mounting surfaces that couple to the level surface of the endcaps and are parallel to the measuring surfaces of the frame, according to an exemplary embodiment.

FIG. 8 illustrates frame 14 for supporting level surfaces 20 of vial 12. Mounting surfaces 22 are defined along datum plane B 34 to be oriented (e.g., parallel) with datum plane A 32. Measuring surfaces 16 are oriented along datum plane A 32 to define the orientation of datum plane B 34. As illustrated, datum plane A 32 is parallel to datum plane B 34, but other orientations are considered. For example, datum plane B 34 may be oriented at 0° (parallel), 30°, 45°, 60°, 90° (perpendicular), or some other orientation to datum plane A 32. In addition, frame 14 may support a plurality of vials 12 in various orientations, by including mounting surfaces 22 defining datum plane B 34 in the desired orientation. In some embodiments, frame 14 includes a machined side surface 28 to allow for measurement of other angles (e.g., with two or more vials 12).

Figure 9:
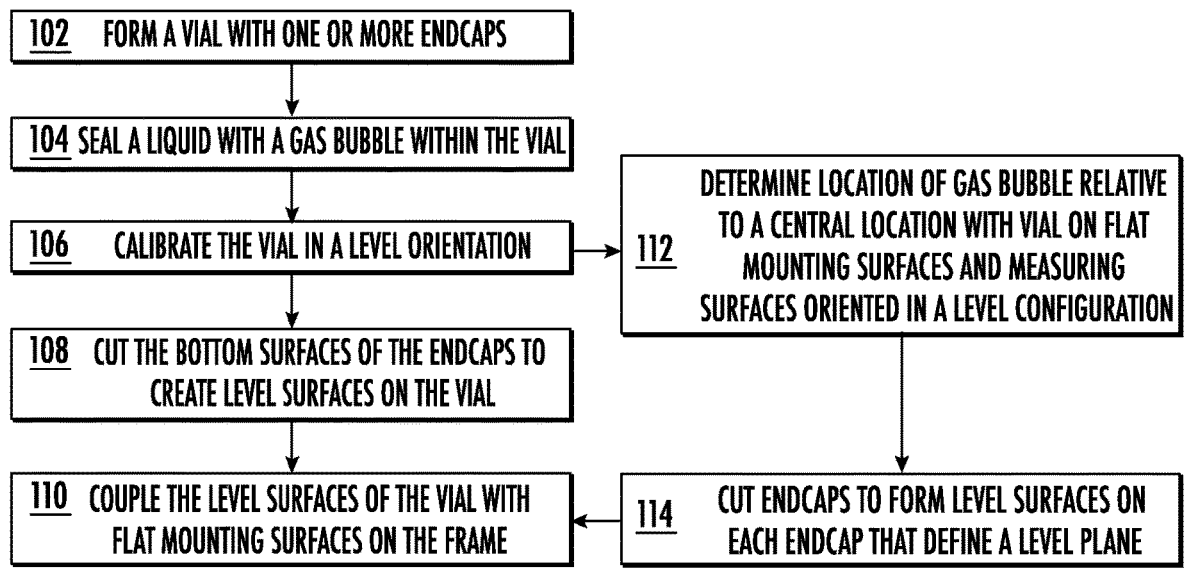
FIG. 9 is a flow diagram of a process of manufacturing a level, according to an exemplary embodiment.

FIG. 9 illustrates a method 100 for installing a calibrated vial 12 within a level frame 14. The process involves forming a vial 12 with one or more endcaps 30 on opposite sides of vial 12 in step 102. In some embodiments, the endcaps 30 are a plastic polymer. In some embodiments, endcaps 30 are metallic and couple to or seal vial 12. Step 104 seals a liquid (e.g., alcohol, water, or other fluid) within vial 12 and creates a gas level indicator 36 within the liquid. Vial 12 contains a sealed liquid that forms a gas level indicator 36. In some embodiments, vial 12 is injection molded to form level surfaces 20 on endcaps 30 and sealed with an ultrasonic welding process. Once vial 12 is formed and a liquid with a level indicator 36 is sealed by endcaps 30, vial 12 is oriented into a calibrated level position in step 106, such that the level indicator 36 is centered within vial 12. In this calibrated position, the bottom surfaces of endcaps 30 are formed, molded, milled, machined, and/or cut to create level surfaces on the bottom of vial 12 in step 108. The level surfaces of endcaps 30 on vial 12 are coupled to the mounting surfaces formed on the frame in step 110. This coupling creates a calibrated and toleranced level measurement along the plane joining the level surfaces of the vial with the mounting surfaces of the frame. In this configuration, measuring surfaces 16 are configured to measure an orientation of level 10.

In step 112, the location of the gas level indicator 36 within vial 12 is determined relative to a central location when measuring surfaces 16 of frame 14 are oriented in a level configuration. In step 114, endcaps 30 are cut or milled to form level surfaces 20 on each endcap 30 that define a level plane. When the level plan formed by the cut endcaps 30 is coupled to mounting surfaces 22 on frame 14, vial 12 is centered within the specified tolerance.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A level, comprising:
    a vial comprising:
        first and second endcaps sealed on opposite ends of the vial, each endcap comprising a level surface, wherein the level surface of the first endcap and the level surface of the second endcap are coplanar and define a first plane; and
        a level indicator located within the vial; and
    a frame comprising:
        two mounting surfaces that engage the level surfaces of the first and second endcaps of the vial; and
        a level measuring surface parallel to the first plane.

2. The level of claim 1, wherein the level measuring surface defines a lower surface of the level.

3. The level of claim 1, wherein the vial is coupled to the frame with an adhesive.

4. The level of claim 1, comprising a magnet located in the level measuring surface.

5. The level of claim 1, wherein the level measuring surface extends along a longitudinal axis of the frame.

6. The level of claim 5, comprising:
    a detent in the level measuring surface; and
    a magnet located in the detent.

7. A level, comprising:
    a vial comprising:
        a first endcap sealed to a first end of the vial;
        a second endcap sealed to a second end of the vial opposite the first end, each endcap comprising a lower surface; and
        a level indicator located within the vial; and
    a frame comprising:
        a mounting surface that defines a first plane, the mounting surface configured to engage the lower surfaces of the first and second endcaps; and
        a level measuring surface that is parallel to the first plane.

8. The level of claim 7, wherein the level measuring surface defines a lower surface of the level.

9. The level of claim 7, wherein the vial is coupled to the frame with an adhesive.

10. The level of claim 9, wherein the adhesive is inserted into first and second gaps between the first and second endcaps and the frame, wherein the first and second gaps are at opposing ends of the vial.

11. The level of claim 7, comprising a lens that surrounds the vial.

12. The level of claim 7, comprising a shroud that surrounds the first and second endcaps and the vial.

13. The level of claim 7, wherein the lower surface of the first endcap and the lower surface of the second endcap are coplanar and define a second plane.

14. The level of claim 13, wherein the second plane is parallel to the level measuring surface.

15. The level of claim 7, wherein the first and second endcaps are spot welded to the mounting surface of the frame.

16. A method of installing a vial within a level frame, the method comprising:
    forming the vial with endcaps on opposite sides of the vial, the vial comprising a level indicator located within the vial;
    providing a level frame having a planar measuring surface and a flat vial mounting surface;
    determining a location of the level indicator within the vial when the measuring surface of the frame is oriented in a level configuration;
    orienting the vial at the endcaps in a level position until the level indicator is centered within a tolerance;
    cutting the endcaps of the oriented vial to form level surfaces on each endcap that define a level plane, wherein the level surfaces on each endcap are cut when the vial is oriented in a level position; and
    engaging the endcaps with the flat vial mounting surface of the frame.

17. The method of claim 16, wherein the step of engaging the endcaps with the flat vial mounting surface of the frame comprises spot welding the endcaps to the flat vial mounting surface of the frame.

18. The method of claim 16, wherein the step of engaging the endcaps with the flat vial mounting surface of the frame comprises inserting adhesive into gaps between the endcaps and the frame.

19. The method of claim 18, wherein the gaps are defined between the frame and opposing ends of the vial.

20. The method of claim 16, wherein the level frame comprises a detent in the planar measuring surface, and a magnet located in the detent.

* * * * *